(12) United States Patent
Tewksbary et al.

(10) Patent No.: US 8,925,105 B2
(45) Date of Patent: Dec. 30, 2014

(54) INDEXED SECURITY FOR USE WITH DATABASES

(75) Inventors: David Edward Tewksbary, Bolton, MA (US); Clark David Milliken, Harvard, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 173 days.

(21) Appl. No.: 13/595,577

(22) Filed: Aug. 27, 2012

(65) Prior Publication Data

US 2014/0059699 A1    Feb. 27, 2014

(51) Int. Cl.
    *H04L 29/06*    (2006.01)
(52) U.S. Cl.
    USPC .......................................................... 726/27
(58) Field of Classification Search
    USPC .......................................................... 726/27
    See application file for complete search history.

(56) References Cited

U.S. PATENT DOCUMENTS

| | | | |
|---|---|---|---|
| 5,778,365 A * | 7/1998 | Nishiyama | 1/1 |
| 6,820,082 B1 | 11/2004 | Cook et al. | |
| 7,130,852 B2 * | 10/2006 | Parent | 707/778 |
| 7,240,046 B2 * | 7/2007 | Cotner et al. | 707/769 |
| 7,464,080 B2 * | 12/2008 | Cotner et al. | 1/1 |
| 7,617,211 B2 * | 11/2009 | Kres | 1/1 |
| 7,720,894 B2 * | 5/2010 | Parent | 707/781 |
| 8,051,487 B2 | 11/2011 | Huang et al. | |
| 8,165,305 B2 * | 4/2012 | Chrysler et al. | 380/277 |
| 8,316,417 B2 * | 11/2012 | Di Battista et al. | 726/2 |
| 8,364,714 B2 * | 1/2013 | Kliewe | 707/784 |
| 8,478,713 B2 * | 7/2013 | Cotner et al. | 709/225 |
| 2002/0032642 A1 * | 3/2002 | Chichilnisky | 705/37 |
| 2003/0023868 A1 * | 1/2003 | Parent | 713/200 |
| 2003/0154099 A1 * | 8/2003 | Tuijn et al. | 705/1 |
| 2004/0044655 A1 * | 3/2004 | Cotner et al. | 707/3 |
| 2005/0198017 A1 * | 9/2005 | Gaponoff | 707/3 |
| 2005/0289144 A1 * | 12/2005 | Dettinger et al. | 707/9 |
| 2006/0004840 A1 * | 1/2006 | Senda | 707/102 |
| 2006/0026180 A1 * | 2/2006 | Kres | 707/100 |
| 2006/0230042 A1 | 10/2006 | Butler et al. | |
| 2007/0094298 A1 * | 4/2007 | Parent | 707/102 |
| 2007/0244898 A1 * | 10/2007 | Cotner et al. | 707/9 |
| 2009/0030907 A1 * | 1/2009 | Cotner et al. | 707/9 |
| 2009/0043775 A1 * | 2/2009 | Cotner et al. | 707/9 |
| 2010/0043057 A1 * | 2/2010 | Di Battista et al. | 726/2 |
| 2010/0142710 A1 * | 6/2010 | Chrysler et al. | 380/277 |
| 2010/0312785 A1 * | 12/2010 | Kliewe | 707/769 |
| 2011/0093485 A1 | 4/2011 | Chang et al. | |

* cited by examiner

*Primary Examiner* — Bradley Holder
(74) *Attorney, Agent, or Firm* — Hamilton, Brook, Smith & Reynolds, P.C.

(57) ABSTRACT

A computer-implemented method for providing security in a relational database hosted by a first server, and configured to interact with a second server, includes associating a first ownership vector with an object in the relational database, detecting a change to the object, and associating a second ownership vector with the object in response to detecting the change to the object.

15 Claims, 4 Drawing Sheets

INDEXED SECURITY FOR USE WITH DATABASES

BACKGROUND OF THE INVENTION

The embodiments described herein relate generally to database indices and, more particularly, to database security using one or more indices.

Object-level security in an enterprise application traditionally uses a simple model in which an administrator defines users, assigns the users to groups and/or roles, and defines certain access privileges for those users, groups, and/or roles. For example, each object in a relational database has an associated access control list that describes what users, groups, and/or roles have access to the object. However, such security methods result in poor performance because search results in the database must also be filtered based on the access control lists of returned objects. Moreover, such security methods require the filtering to be performed on the client side, which increases the risk of exposing data that should not be. Furthermore, such security methods use some means of displaying data that cannot be effectively filtered such that even known search-and-filter methods still expose data that should not be.

BRIEF DESCRIPTION OF THE INVENTION

In one aspect, a computer-implemented method is described for providing security in a relational database hosted by a first server and configured to interact with a second server. The computer-implemented method includes associating a first ownership vector with an object in the relational database, detecting a change to the object, and associating a second ownership vector with the object in response to detecting the change to the object.

In another aspect, a computer device includes a memory area configured to store a relational database and a processor coupled to the memory area. The relational database is configured to interact with a remote computer device. The processor is configured to associate a first ownership vector with an object in the relational database, detect a change to the object, and associate a second ownership vector with the object in response to detecting the change to the object.

In another aspect, a computer system includes a memory area configured to store a relational database, and at least one application server coupled to the memory area. The application server is configured to associate a first ownership vector with an object in the relational database, detect a change to the object, and associate a second ownership vector with the object in response to detecting the change to the object.

BRIEF DESCRIPTION OF THE DRAWINGS

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

In the embodiments described herein, the term "object" is an application-defined unit of data, such as any defined object in a database that is used to store, query, or reference data. Exemplary types of database objects include clusters, sequences, indexes, stored procedures, and synonyms. The above examples are exemplary only and, thus, are not intended to limit in any way the definition and/or meaning of the term "object."

Exemplary embodiments of computer systems, computer devices, and computer-implemented methods or processes for use in providing security in a relational database system are described herein. The embodiments described herein facilitate compiling security rules of a system into a security index that can be used by both a relational database and a remote server, such as a full-text search server, to evaluate security. Specifically, embodiments of the invention facilitate creation of an ownership vector that includes access assignments for a particular stage of an object's lifecycle and/or ownership. Moreover, embodiments of the invention facilitate invalidation and recalculation of the ownership vector upon detection of changes to the object itself, the access assignments of the object, and/or the lifecycle of the object. Embodiments of the invention also facilitate pushing, transmitting, or publishing changes of the ownership vector to a remote server, such as a full-text search server, to keep the security changes current in both systems. Furthermore, embodiments of the invention facilitate incorporating the ownership vector into queries for information from the relational database.

Object-level security in enterprise applications traditionally uses a simple model wherein an administrator defines users, assigns the users to groups and/or roles, and defines certain access privileges for those users, groups, and/or roles. For example, each object in a relational database has an associated access control list that describes what users, groups, and/or roles have access to the object. In such a simple security model, sharing an implementation of that model between a relational database and a remote server, such as a full-text search server, is achieved either by having a common security manager or by duplicating the objects' access control lists across both systems. An example is a method of security evaluation wherein a query is sent by a client computer device to the full-text search server, to which the full-text search server returns a list of objects. Security filters are evaluated against these objects on the client side by passing the returned objects through the relational database for a security check, such as by comparing the user, the user's group, and/or the user's role against each object's access control list.

There are multiple problems to such an approach. First, performance is diminished. For example, when a user has not been granted access to view all data exposed by a query via the remote server, the client device must fetch all objects from the relational database and then filter so that only objects are displayed for which the user has been granted access. Second, because non-secured objects are returned to the client device from the relational database, there is risk of exposing data to which the user has not been granted access. Moreover, with this approach query results do not factor security attributes into summary or composite information such as facets (e.g., categories, classes, etc.) or other similar means of presenting information that cannot be filtered by the client device. This final problem renders facets or other similar means unusable in sensitive environments because the facets would reveal data of both secured and unsecured objects.

The above problems are solved using the embodiments described herein. For example, embodiments of the invention solve the problem by compiling security rules of a system into a security index that can be used by both a relational database and a remote server, such as a full-text search server, to evaluate security. Specifically, exemplary technical effects of the systems, methods, and devices described herein include at least one of: (a) creating an ownership vector for each unique combination of a number of security attributes in a system, and assigning an ownership vector to each object in a relational database based on, for example, a particular stage in an object's lifecycle and/or ownership; (b) invalidating or breaking the association between the ownership vector and the object when the object's lifecycle and/or ownership changes; (c) assigning a different ownership vector to the object based on the changes; (d) pushing, publishing, or transmitting the ownership vector to the remote server such that security is the same across both systems; and (e) incorporating the ownership vector into queries into the system as a whole.

Embodiments of the invention build a security index, or ownership vector, based on unique combinations of security attributes. Each object is associated with an appropriate ownership vector rather than having a single, unitary security index that covers all objects and all possible combinations of security attributes. One advantage to the object-by-object ownership vector is that it enables a system to have a better view of the access allowed on an object by examining other aspects other than the object's lifecycle status. Moreover, storing the ownership vector as a separate object facilitates updates of security rules to be more quickly reflected in a foreign, or remote, system. Another advantage of the embodiments described herein is fully-secured objects and/or facets across all servers that access the relational database. Moreover, the embodiments described herein facilitate enhanced search performance as objects are filtered out in the initial query to the server and, therefore, are not part of other operations in the query pipeline, such as facet calculation, storing, and/or relevance calculations. Furthermore, the embodiments described herein facilitate automatic synchronization of the system security model between two or more systems.

Figure 1:
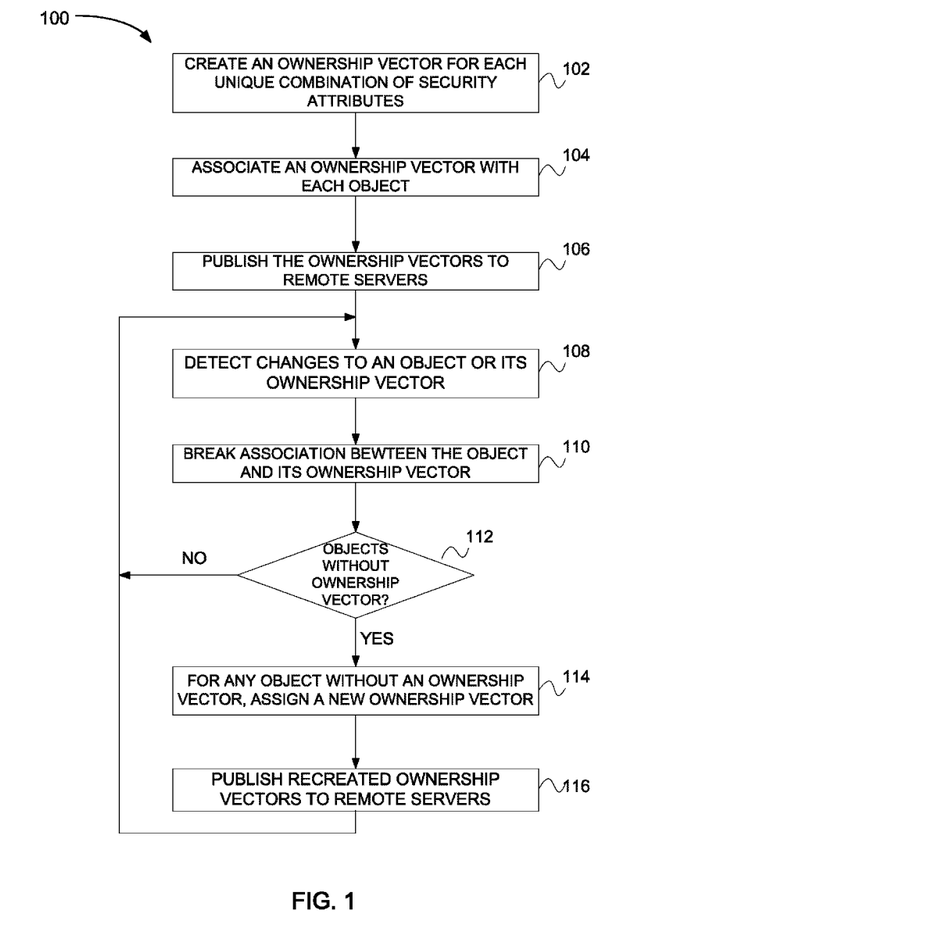
FIG. 1 is a flowchart that illustrates an exemplary computer-implemented method for use in providing security in a relational database system.

FIG. 1 is a flowchart 100 that illustrates an exemplary computer-implemented method for providing security in a relational database hosted by a first server and configured to interact with a second server. More specifically, flowchart 100 illustrates a method for providing a shared security model in a computer network that includes a relational database and one or more application servers, such as a full-text search server. In an exemplary embodiment, a computer creates 102 an ownership vector for each unique combination of security attributes in the relational database. In an exemplary embodiment, the ownership vector of a particular object describes the access enabled for the object based on the conditions that make up the overall system security model. An object in an enterprise system generally has certain access rights granted and/or revoked based at least in part on the object's lifecycle status. For example, a newly created object may have access granted only to a developer user that develops or implements that object. Once the object moves to the next lifecycle stage, such as an approval stage, an approver user (e.g., a manager or validation user) may be granted access rights, while the developer user maintains access rights in case the object needs to be modified. Moreover, access may also be affected by ownership concepts associated to the object. For example, an object may be assigned an owner, a project, and/or an organization, any of which can also affect the access granted and/or revoked on the object. The organization may also include users, groups, and/or roles that are granted certain access to the object. In some embodiments, the ownership vector is itself an object having metadata that holds information about the security model. The computer assigns 104 an ownership vector, such as a first ownership vector, to each object based on one or more of the object's security attributes or properties.

The computer then publishes 106 or transmits the ownership vectors, or at least a portion of the ownership vectors, and including at least the first ownership vector, to a remote server, such as a full-text search server, for storage and reference. Moreover, during use, the computer detects 108 changes to an object, the ownership vector, and/or to the overall system security model that affect the ownership vector. When the computer detects such a change, the association between the object and the first ownership vector is broken or marked invalid 110. In some embodiments, the computer repeatedly, such as periodically, executes a script that determines 112 whether any object is not associated with an ownership vector, such as for a new object or for an object whose association with an ownership vector was broken. When a new object exists or an object exists without an associated ownership vector, the computer assigns 114 an ownership vector, such as a second ownership vector, to the object based on one or more of the object's security attributes or properties. The computer then re-publishes 116 or transmits the ownership vectors, or at least a portion of the ownership vectors, and including at least the second ownership vector, to the remote server for storage and reference.

Figure 2:
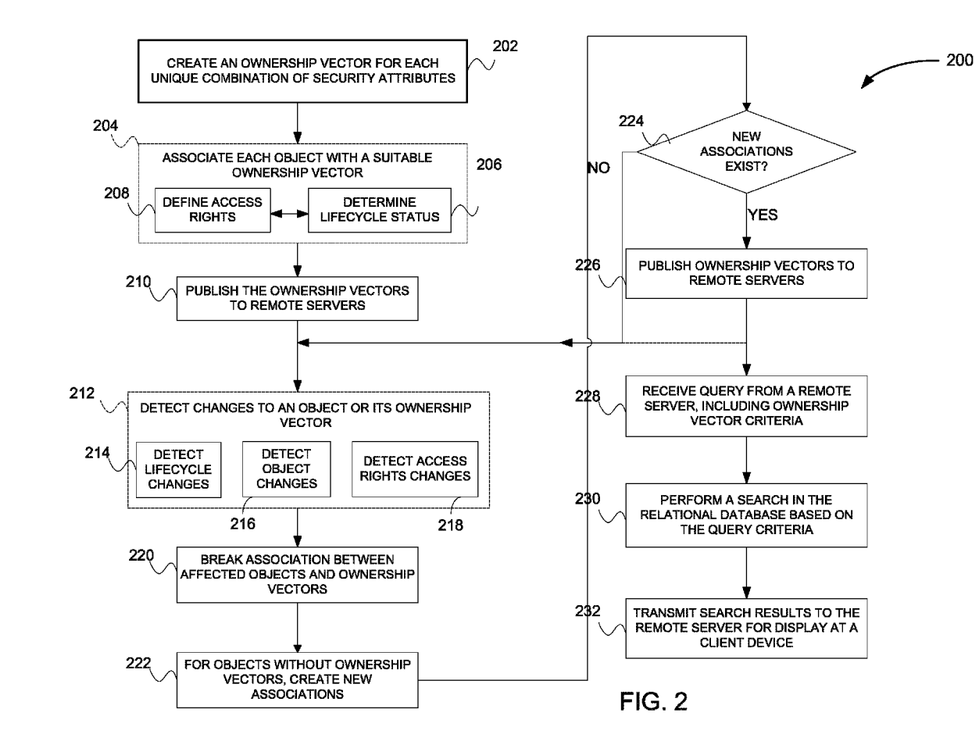
FIG. 2 is a more detailed flowchart that illustrates the method shown in FIG. 1.

FIG. 2 is a flowchart 200 that illustrates the computer-implemented method of FIG. 1 in greater detail. In an exemplary embodiment, a computer creates 202 or generates an ownership vector for each unique combination of security attributes used in a relational database system. As described above, the security attributes may include the access enabled for the object based on the conditions that make up the overall system security model. Moreover, the security attributes may include the assignments that have access to the object and the conditions for that access. In some embodiments, the ownership vector is itself an object having metadata that holds information about the security model. The computer then associates or links 204 each object in the relational database to an appropriate ownership vector, such as a first ownership vector, based on one or more properties of the object, such as security attributes, lifecycle status, and/or assigned access privileges. More specifically, the computer determines 206 a lifecycle status of each object and/or defines 208 access rights to certain users, groups, roles, and/or projects based on the lifecycle status. Alternatively, the computer may define 208 the access rights to certain users, groups, roles, and/or projects based only on the system security context rather than on the lifecycle status. In some embodiments, an administrator user defines 208 the access rights to certain users, groups, roles, and/or projects based on the system security context and/or the lifecycle status. The assigned ownership vector is based on one or more of these properties or definitions.

The computer then publishes 210, such as transmits via a network, at least a portion of the ownership vectors, including at least the first ownership vector, to a remote server, such as a full-text search server. During use, the computer detects 212 changes to an object, the ownership vector, and/or to the overall system security model that affect the link between the object and the first ownership vector. Alternatively, an administrator user may detect 212 or learn of changes to an object, the ownership vector of an object, and/or to the overall system security model that would affect the link between the object and its associated ownership vector. Specifically, the computer or administrator user may detect 214 a change to the lifecycle status of one or more objects. Moreover, the computer or administrator user may detect 216 changes to one or more objects, such as parameter or property changes of one or more objects. The computer or administrator user may also, or alternatively, detect 218 changes to access rights for one or more users, roles, groups, and/or projects that are applied to one or more objects.

Based on the detected changes, if any, the computer breaks or deletes 220 the association between the object and its ownership vector, or marks the association invalid. For example, when a change is detected to an object's ownership vector, the object "forgets" or deletes its ownership vector. As another example, when something an ownership vector relies on changes, such as a change in a user's role or access hierarchy, the computer flags the ownership vector as invalid. As yet another example, the ownership vector itself may become unusable, such as when a user is deleted from the system. In such a case the computer marks the ownership vector as obsolete, which is a variation of invalid for the purposes of the embodiments described herein. In an exemplary embodiment, the computer detects, via a script, for example, objects that are not associated with an ownership vector. For such objects, the computer associates 222 the object with an ownership vector, such as a second ownership vector, based on the object's security attributes. In embodiments in which the ownership vectors are themselves database objects with metadata information about the security model, the ownership vectors themselves can be monitored by daemons or other scripts and/or crawled for content. In some embodiments, a periodic script determines whether any ownership vectors are marked as invalid or if new objects have been created.

When the computer determines 224 that there are new associations between ownership vectors and objects, the computer publishes 226, such as transmits via a network, at least a portion of the ownership vectors, including at least the second ownership vector, to the remote server. In some embodiments, the computer continues to monitor changes to objects that result in the related ownership vectors to be broken 220, associates 222 ownership vectors accordingly, and publishes 226 the newly associated ownership.

In an exemplary embodiment, and during use, the computer may receive 228 a query from the remote server, wherein the query includes ownership vector criteria. For example, a user of a client device may enter a query that is processed by a full-text search server. Because the full-text search server also stores the ownership vectors, such criteria can be joined into the query before the query is sent to the relational database server. Exemplary ownership vector criteria includes, but is not limited to, user identification such as user name, user group, or user role that can be used to determine the proper database objects while filtering out database objects that the user does not have access to. The computer performs 230 a search of the relational database using the joined query and returns or transmits 232 the results to the remote server for display at the client device or for further processing by the remote server or client device.

Figure 3:
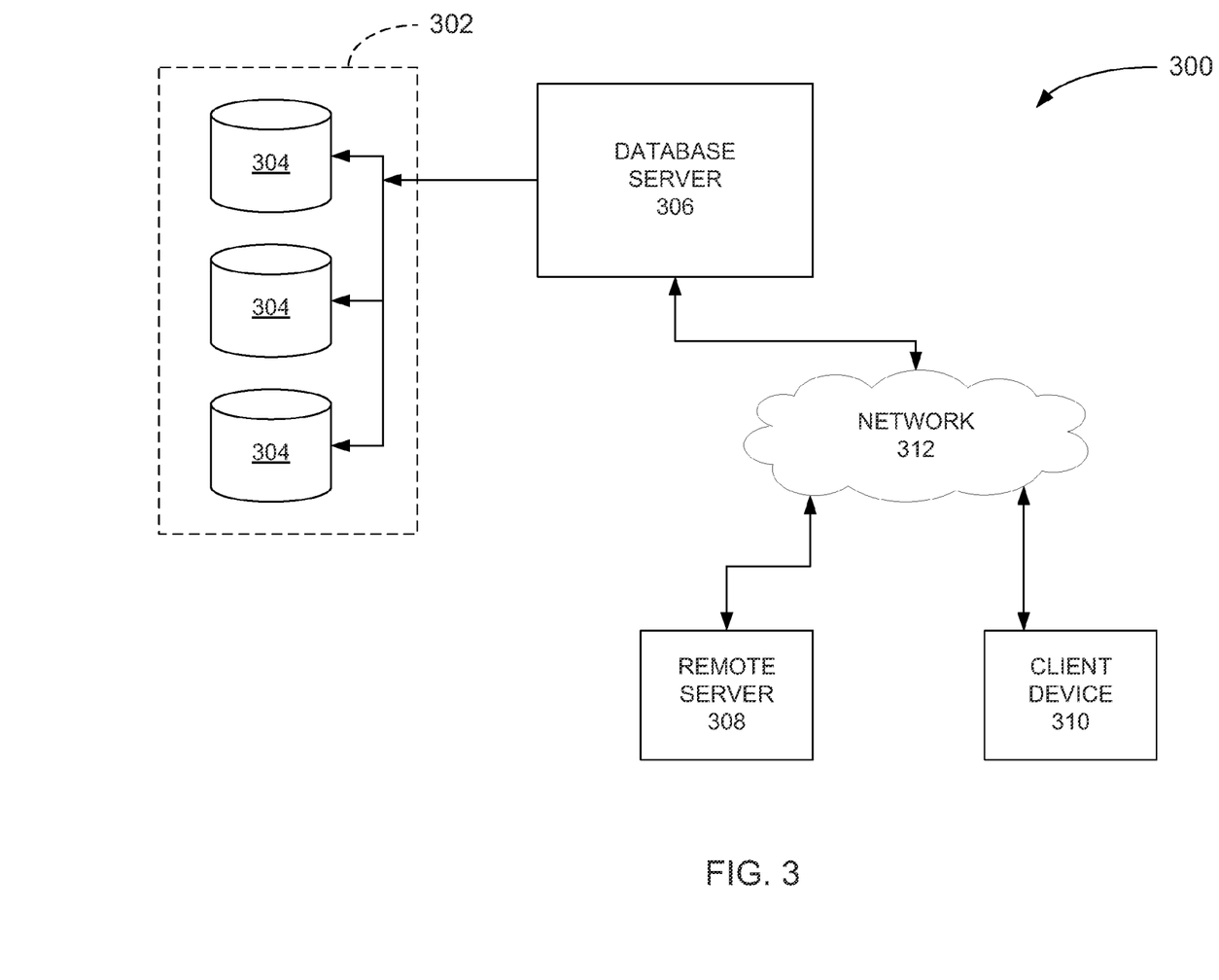
FIG. 3 is a schematic block diagram of an exemplary computer network for use with the method shown in FIGS. 1 and 2.

FIG. 3 is a schematic block diagram of an exemplary computer system 300 for use in providing security in a relational database and for use in performing the processes described above and/or additional processes that may be related to those described above. In an exemplary embodiment, a memory area 302 includes one or more storage devices 304 for use in storing data, such as metadata, database objects, relationships between database objects, ownership vector objects, security indices, or any suitable information or data. In some embodiments, the memory area 302 is coupled to a first application server, such as a database server 306, which is in turn coupled to one or more second application servers, such as remote server 308, which may be a full-text search server, and one or more client systems or devices 310, such as an administrator system and/or a user system, via a network 312. The storage devices 304 may be embodied as one or more databases, may be located at a single or at multiple geographical sites, or may be integrated with the database server 306. Moreover, the servers 306 and 308 may be located at a single or at multiple graphical sites. In single-site embodiments, the servers 306 and 308 may be integrated into a single device using multiple application servers or logic, such that server 306 is a database application and server 308 is a full-text search application.

As can be appreciated, the network 312 can be a public network, such as the Internet, or a private network such as an LAN or WAN network, or any combination thereof and can also include PSTN or ISDN sub-networks. The network 312 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 312 is merely exemplary and in no way limits the scope of the present advancements.

As one of ordinary skill in the art would recognize, the database server 306, the remote server 308, and the client systems 310 can be any suitable computer system such as the one described below with reference to FIG. 4, or any other computing system that is known. Moreover, it should be understood that the database server 306 is configured to perform the processes described above and/or any additional processes that may be related to those described above.

The database server 306 stores the non-transitory, computer-readable instructions to execute the processes described above, and provides these instructions via the network 312 to the remote server 308 and/or the client systems 310. Moreover, the database server 306 can also provide data from the memory area 302 as needed to the remote server 308 and/or the client systems 310. As such, FIG. 3 includes implementations of the computer system 300 via cloud computing, distributed computing, and the like.

During operation, the computer system 300 performs the steps shown in FIGS. 1 and 2, both described above. For example, and with reference to FIG. 1, the database server 306 creates an ownership vector for each unique combination of security attributes in the relational database of memory area 302. The database server 306 then assigns an ownership vector, such as a first ownership vector, to each object based on one or more of the object's security attributes or properties. The database server 306 then publishes or transmits the ownership vectors, or at least a portion of the ownership vectors, and including at least the first ownership vector, to the remote server 308 for storage and reference. Moreover, during use, the database server 306 detects changes to an object, the ownership vector, and/or to the overall system security model that affect the association between the object and its ownership vector. When the database server 306 detects such a change, the association between the object and its ownership vector (i.e., the first ownership vector) is broken or marked invalid. In some embodiments, the database server 306 repeatedly, such as periodically, executes a script that determines whether any object is not associated with an ownership vector, such as for a new object or for an object whose association with an ownership vector was broken. When a new object exists or an object exists without an associated ownership vector, the database server 306 assigns an ownership vector, such as a second ownership vector, to the object based on one or more of the object's security attributes or properties. The database server 306 then re-publishes or transmits the ownership vectors, or at least a portion of the ownership vectors, and including at least the second ownership vector, to the remote server 308 or client system 310. Notably, the first and second ownership vectors may be the same based on the security attributes or other properties of the object. For example, the first and second ownership vectors may be aligned with overlapping security attributes as designed by the system administrator. However, it should be noted that the first and second ownership vectors may also be different based on the security attributes or other properties of the object.

Furthermore, the database server 306 may receive a query from the remote server 308, wherein the query includes ownership vector criteria. For example, the client system 310 may generate a query based on user inputs, and transmit the query to the remote server 308 for execution via the database server 306. The remote server 308 joins the ownership vector data into the query before the query is sent to the database server 306. The database server 306 performs a search of the relational database using the joined query and returns or transmits the results to the remote server 308 and/or the client system 310 for display at the client system 310 or for further processing by the remote server 308 or the client system 310. In other embodiments, the remote server 308 itself performs the search using the joined query. In such embodiments, such as when the remote server 308 is a full-text server, the remote server 308 has stored a copy of the ownership vectors and object references to the ownership vectors (i.e., references to the objects that are associated with each ownership vector). Accordingly, in such embodiments, the remote server 308 performs the query without the database server 306.

Figure 4:
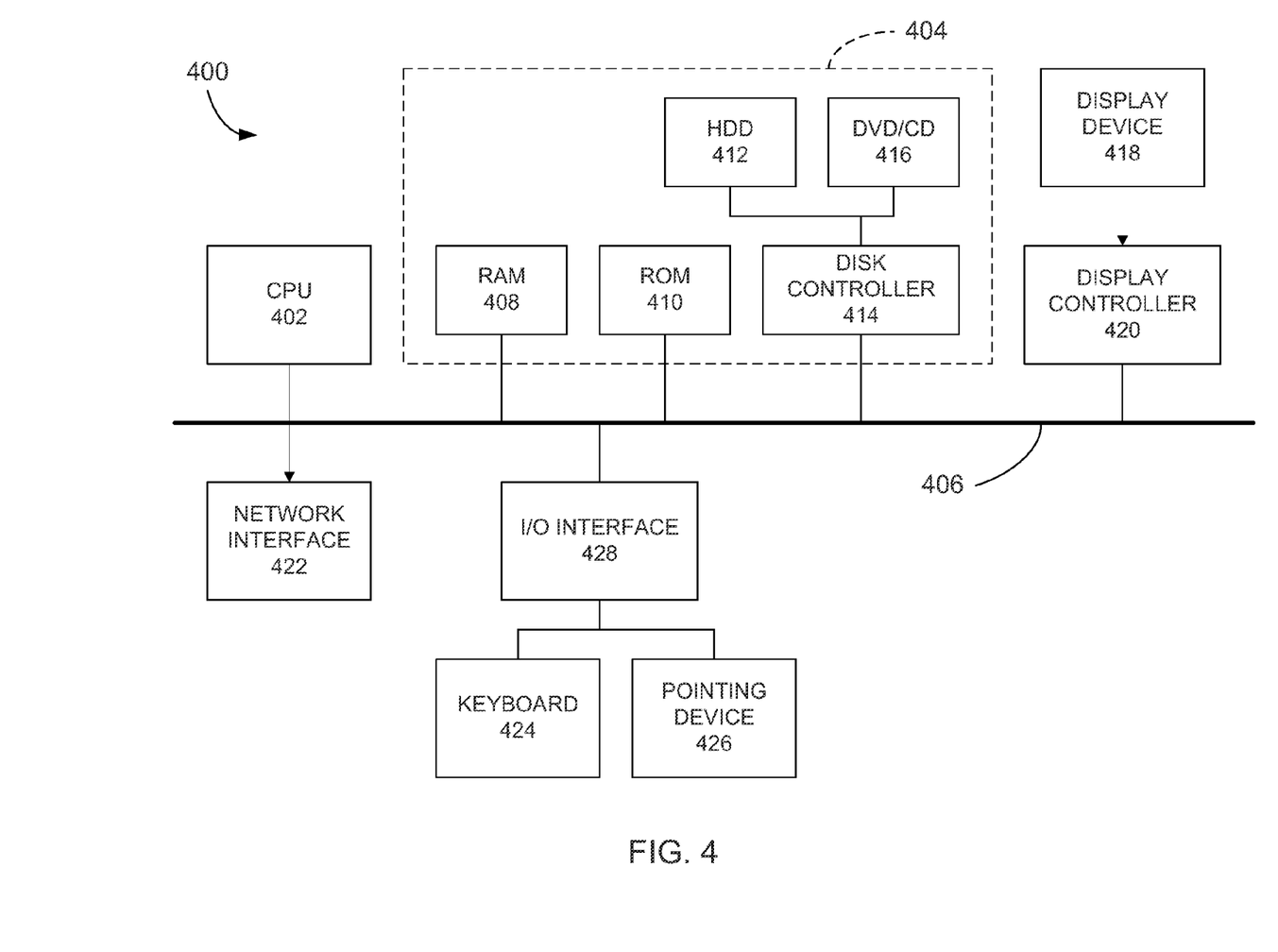
FIG. 4 is a schematic block diagram of an exemplary computer architecture for use with the method shown in FIGS. 1 and 2.

FIG. 4 is a schematic block diagram of an exemplary computer architecture 400 for use with the database server 306 (shown in FIG. 3). In some embodiments, and as described above, servers 306 and 308 (also shown in FIG. 3) may be integrated into a single device. In such embodiments, the integrated device may be designed with a substantially similar computer architecture 400 as that shown in FIG. 4.

In an exemplary embodiment, the computer architecture 400 includes one or more processors 402 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 404 that is operably and/or communicatively coupled to the processor 402 by a system bus 406. A "memory area," as used herein, refers generally to any means of storing program code and instructions executable by one or more processors to aid in maintaining current database object values and/or paths. The memory area 404 may include one, or more than one, forms of memory. For example, the memory area 404 may include random-access memory (RAM) 408, which can include non-volatile RAM, magnetic RAM, ferroelectric RAM, and/or other forms of RAM. The memory area 404 may also include read-only memory (ROM) 410 and/or flash memory and/or electrically-programmable read-only memory (EEPROM). Any other suitable magnetic, optical, and/or semiconductor memory, such as a hard-disk drive (HDD) 412, by itself or in combination with other forms of memory, may be included in the memory area 404. The HDD 412 may also be coupled to a disk controller 414 for use in transmitting and receiving messages to and from the processor 402. Moreover, the memory area 404 may also be, or may include, a detachable or removable memory 416, such as a suitable cartridge disk, CD-ROM, DVD, or USB memory. The above examples are exemplary only and, thus, are not intended to limit in any way the definition and/or meaning of the term "memory area."

Furthermore, in some embodiments, the memory area 404 includes a relational database. As used herein, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The computer architecture 400 also includes a display device 418 that is coupled, such as operatively coupled, to a display controller 420. The display controller 420 receives data via the system bus 406 for display by the display device 418. The display device 418 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 418 may include a touchscreen with an associated touchscreen controller. The above examples are exemplary only and, thus, are not intended to limit in any way the definition and/or meaning of the term "display device."

In addition, the computer architecture 400 includes a network interface 422 for use in communicating with a network (not shown in FIG. 4). Moreover, the computer architecture 400 includes one or more input devices, such as a keyboard 424 and/or a pointing device 426, such as a roller ball, mouse, touchpad, and the like. The input devices are coupled to and controlled by an input/output (I/O) interface 428, which is further coupled to the system bus 406.

A description of the general features and functionality of the display device 418, keyboard 424, pointing device 426, as well as the display controller 420, disk controller 414, network interface 422, and I/O interface 428 is omitted herein for brevity as these features are known.

During operation, the computer system 300 performs the steps shown in FIGS. 1 and 2, both described above. For example, and with reference to FIG. 1, the processor 402 creates an ownership vector for each unique combination of security attributes in the relational database. The processor 402 then assigns an ownership vector, such as a first ownership vector, to each object based on one or more of the object's security attributes or properties. The processor 402 publishes or transmits the ownership vectors, or at least a portion of the ownership vectors, and including at least the first ownership vector, to a remote server for storage and reference. Moreover, during use, the processor 402 detects changes to an object, the ownership vector, and/or to the overall system security model that affect the association between the object and its ownership vector. When the processor 402 detects such a change, the association between the object and its ownership vector (i.e., the first ownership vector) is broken or marked invalid. In some embodiments, the processor 402 repeatedly, such as periodically, executes a script that determines whether any object is not associated with an ownership vector, such as for a new object or for an object whose association with an ownership vector was broken. When a new object exists or an object exists without an associated ownership vector, the processor 402 assigns an ownership vector, such as a second ownership vector, to the object based on one or more of the object's security attributes or properties. The processor 402 then re-publishes or transmits the ownership vectors, or at least a portion of the ownership vectors, and including at least the second ownership vector, to the remote server. Notably, the first and second ownership vectors may be the same based on the security attributes or other properties of the object. For example, the first and second ownership vectors may be aligned with overlapping security attributes as designed by the system administrator. However, it should be noted that the first and second ownership vectors may also be different based on the security attributes or other properties of the object.

Furthermore, the processor 402 may receive a query from the remote server, wherein the query includes ownership vector criteria. The remote server joins the ownership vector data into the query before the query is sent to the processor 402. The processor 402 performs a search of the relational database using the joined query and returns or transmits the results to the remote server for display at a client system or for further processing by the remote server or the client system.

Exemplary embodiments of computer systems, computer devices, and computer-implemented methods or processes for use in providing security in a relational database are described above in detail. The systems, methods, and devices are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, such as the database server or remote server described herein, includes at least one processor or processing unit and a system memory. The computer typically has at least some form of computer readable media. By way of example and not limitation, computer readable media include computer storage media and communication media. Computer storage media include non-transitory, volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary database system environment, embodiments of the invention are operational with numerous other general purpose or special purpose database system environments or configurations. The database system environment is not intended to suggest any limitation as to the scope of use or functionality of any aspect of the invention. Moreover, the database system environment should not be interpreted as having any dependency or requirement relating to any one or combination of components illustrated in the exemplary operating environment.

Embodiments of the invention may be described in the general context of computer-executable instructions, such as non-transitory program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for providing security in a relational database hosted by a first server and configured to interact with a second server, said computer-implemented method comprising:
   by a hardware processor:
   in the relational database, associating a first ownership vector with an object in the relational database, wherein associating a first ownership vector comprises determining access rights defined for the object;
detecting one of a change relating to the object and a change to the object, wherein detecting a change related to the object comprises detecting a change to the access rights defined for the object; and
associating a second ownership vector with the object in response to detecting the change, wherein associating a second ownership vector comprises determining an appropriate ownership vector based on the change and breaking the association between the first ownership vector and the object in response to the change.

2. The computer-implemented method in accordance with claim 1, wherein associating a second ownership vector comprises determining an appropriate ownership vector based on the change to the access rights.

3. The computer-implemented method in accordance with claim 1, wherein associating a second ownership vector comprises breaking the association between the first ownership vector and the object in response to the change to the access rights.

4. The computer-implemented method in accordance with claim 1, wherein associating a second ownership vector comprises detecting at least one of a broken association between the first ownership vector and the object and a new object having no associated ownership vector.

5. The computer-implemented method in accordance with claim 1, wherein at least one of the first server and the second server includes application logic, said computer-implemented method further comprising:
receiving a query via the application logic; and
performing a search of the relational database based on the query, wherein the query includes criteria related to at least one of the first ownership vector and the second ownership vector.

6. A computer device comprising:
a memory area configured to store a relational database, the relational database configured to interact with a remote computer device; and
a hardware processor coupled to said memory area, said processor configured to:
in the relational database, associate a first ownership vector with an object in the relational database, wherein associating a first ownership vector comprises determining access rights defined for the object;
detect one of a change relating to the object and a change to the object, wherein detecting a change related to the object comprises detecting a change to the access rights defined for the object; and
associate a second ownership vector with the object in response to detecting the change, wherein associating a second ownership vector comprises determining an appropriate ownership vector based on the change and breaking the association between the first ownership vector and the object in response to the change.

7. The computer device in accordance with claim 6, wherein said processor is configured to determine an appropriate ownership vector based on the change to the access rights.

8. The computer device in accordance with claim 6, wherein said processor is configured to break the association between the first ownership vector and the object in response to the change to the access rights.

9. The computer device in accordance with claim 6, wherein said processor is further configured to detect at least one of a broken association between the first ownership vector and the object and a new object having no associated ownership vector.

10. The computer device in accordance with claim 6, wherein said processor is further configured to:
receive a query via application logic; and
perform a search of the relational database based on the query, wherein the query includes criteria related to at least one of the first ownership vector and the second ownership vector.

11. A computer system comprising:
a memory area configured to store a relational database;
at least one application server with a hardware processor coupled to said memory area, said at least one application server configured to:
in the relational database, associate a first ownership vector with an object in the relational database, wherein associating a first ownership vector comprises determining access rights defined for the object;
detect one of a change related to the object and a change to the object, wherein detecting a change related to the object comprises detecting a change to the access rights defined for the object; and
associate a second ownership vector with the object in response to detecting the change, wherein associating a second ownership vector comprises determining an appropriate ownership vector based on the change and breaking the association between the first ownership vector and the object in response to the change.

12. The computer system in accordance with claim 11, wherein said at least one application server is configured to determine an appropriate ownership vector based on the change to the access rights.

13. The computer system in accordance with claim 11, wherein said at least one application server is configured to break the association between the first ownership vector and the object in response to the change to the access rights.

14. The computer system in accordance with claim 11, wherein said at least one application server is configured to detect at least one of a broken association between the first ownership vector and the object and a new object having no associated ownership vector.

15. The computer system in accordance with claim 11, wherein said at least one application server comprises a first application sever coupled to said memory area and a second application server communicatively coupled to said first application server, wherein said first application server is further configured to:
receive a query via said second application server; and
perform a search of the relational database based on the query, wherein the query includes criteria related to at least one of the first ownership vector and the second ownership vector.

* * * * *